US008459896B2

(12) United States Patent
Buch

(10) Patent No.: US 8,459,896 B2
(45) Date of Patent: Jun. 11, 2013

(54) PERMEABLE PAVING SYSTEM

(75) Inventor: Douglas J. Buch, Greenfield, WI (US)

(73) Assignee: ECS Solutions, LLC, Greenfield, WI (US)

(*) Notice: Subject to any disclaimer, the term of this patent is extended or adjusted under 35 U.S.C. 154(b) by 0 days.

(21) Appl. No.: 13/307,863

(22) Filed: Nov. 30, 2011

(65) Prior Publication Data

US 2012/0141202 A1 Jun. 7, 2012

Related U.S. Application Data

(63) Continuation-in-part of application No. 12/014,325, filed on Jan. 15, 2008, now Pat. No. 8,251,607.

(51) Int. Cl.
*E01C 5/00* (2006.01)
(52) U.S. Cl.
USPC ............. 404/29; 404/35; 404/41; 52/604; 52/606; 52/608
(58) Field of Classification Search
USPC ...... 52/600, 603, 604, 606, 608, 609; 404/29, 404/35, 41, 45; 405/302.4, 302.6
See application file for complete search history.

(56) References Cited

U.S. PATENT DOCUMENTS

| | | | | |
|---|---|---|---|---|
| 19,592 | A | * | 3/1858 | Tewkesbury .................... 404/34 |
| 572,762 | A | | 12/1896 | Landers |
| 815,641 | A | | 3/1906 | Schoeneman |
| 4,370,075 | A | | 1/1983 | Scales |
| 4,375,928 | A | * | 3/1983 | Crow et al. ...................... 405/20 |
| 4,564,311 | A | * | 1/1986 | Scales .............................. 405/20 |
| 4,719,738 | A | | 1/1988 | Lee |
| 4,792,257 | A | | 12/1988 | Rinninger |
| 5,159,801 | A | * | 11/1992 | Schmidt ............................ 52/575 |
| 5,281,048 | A | | 1/1994 | Hagenah |
| 5,484,230 | A | * | 1/1996 | Rudloff ............................ 405/20 |
| 5,499,888 | A | | 3/1996 | Hawkes |
| 5,533,827 | A | | 7/1996 | Scheiwiller |
| 5,779,391 | A | * | 7/1998 | Knight ............................. 405/20 |
| 5,797,698 | A | | 8/1998 | Barth et al. |
| D399,577 | S | | 10/1998 | Scales |
| 5,906,456 | A | * | 5/1999 | Knight ............................. 405/20 |
| 5,921,710 | A | | 7/1999 | Scales |
| 6,416,253 | B1 | * | 7/2002 | Wimp et al. ................... 405/172 |

(Continued)

FOREIGN PATENT DOCUMENTS

| | | |
|---|---|---|
| DE | 10244929 A1 | 4/2003 |
| GB | 2134561 A | 8/1984 |
| JP | 7197429 A | 8/1995 |

OTHER PUBLICATIONS

ECO CRETO Frequently Asked Questions, http://www.ecocreto.com/fag.html, Jul. 10, 2007.
Photographs from ECO CRETO Office and parking lot, Jul. 2, 2007.
Advanced Pavement Technology, Eco-Brick and Aqua-Loc Brochure.
SF-RIMA Permaeable Concrete Paving Stone System Brochure.
UNI-Group U.S.A., UNI ECO-Stone website http://www.uni-groupusa.org/uni-eco-.htm, Sep. 12, 2006.
PaveDrain, LLC, Competitive Analysis document, Jul. 2007, pp. 13-14 Discusses EGRA Stone by PAVELOC Industries.
Armortec, Armorflex Standard Detail (Class 70 Dimensions), CAD drawing available online: http://www.contech-cpi.com/media/assets/asset/file_name/5408/Class_70_Dimensions.pdf.
Interntional Search Report for International application No. PCT/US2009/031079, International filing date is Jan. 15, 2009.

*Primary Examiner* — Gary Hartmann
(74) *Attorney, Agent, or Firm* — Boyle Fredrickson S.C.

(57) ABSTRACT

A systems for a permeable pavement system is described. The permeable pavement system includes blocks designed to facilitate water seepage between the blocks and to permit water storage within the blocks. The blocks may be unified together with the use of a cable inserted through each block to create paving units that facilitate installation and maintenance of the pavement system. The paving units may be moved with loops on the ends of the cables. Multiple paving units may be linked together with lock blocks.

15 Claims, 10 Drawing Sheets

U.S. PATENT DOCUMENTS

| | | |
|---|---|---|
| 6,508,607 B1 | 1/2003 | Smith et al. |
| 6,536,988 B2 | 3/2003 | Geiger |
| 6,579,038 B1 * | 6/2003 | McAllister et al. ............. 405/16 |
| 6,939,077 B1 | 9/2005 | Hart |
| D516,735 S | 3/2006 | Kees et al. |
| D575,414 S | 8/2008 | Salerno |
| D609,369 S * | 2/2010 | Buch ........................... D25/113 |
| 8,251,607 B2 * | 8/2012 | Buch .............................. 404/41 |
| 2005/0055983 A1 | 3/2005 | Tomes |
| 2011/0250013 A1 * | 10/2011 | Buch .............................. 404/34 |

* cited by examiner

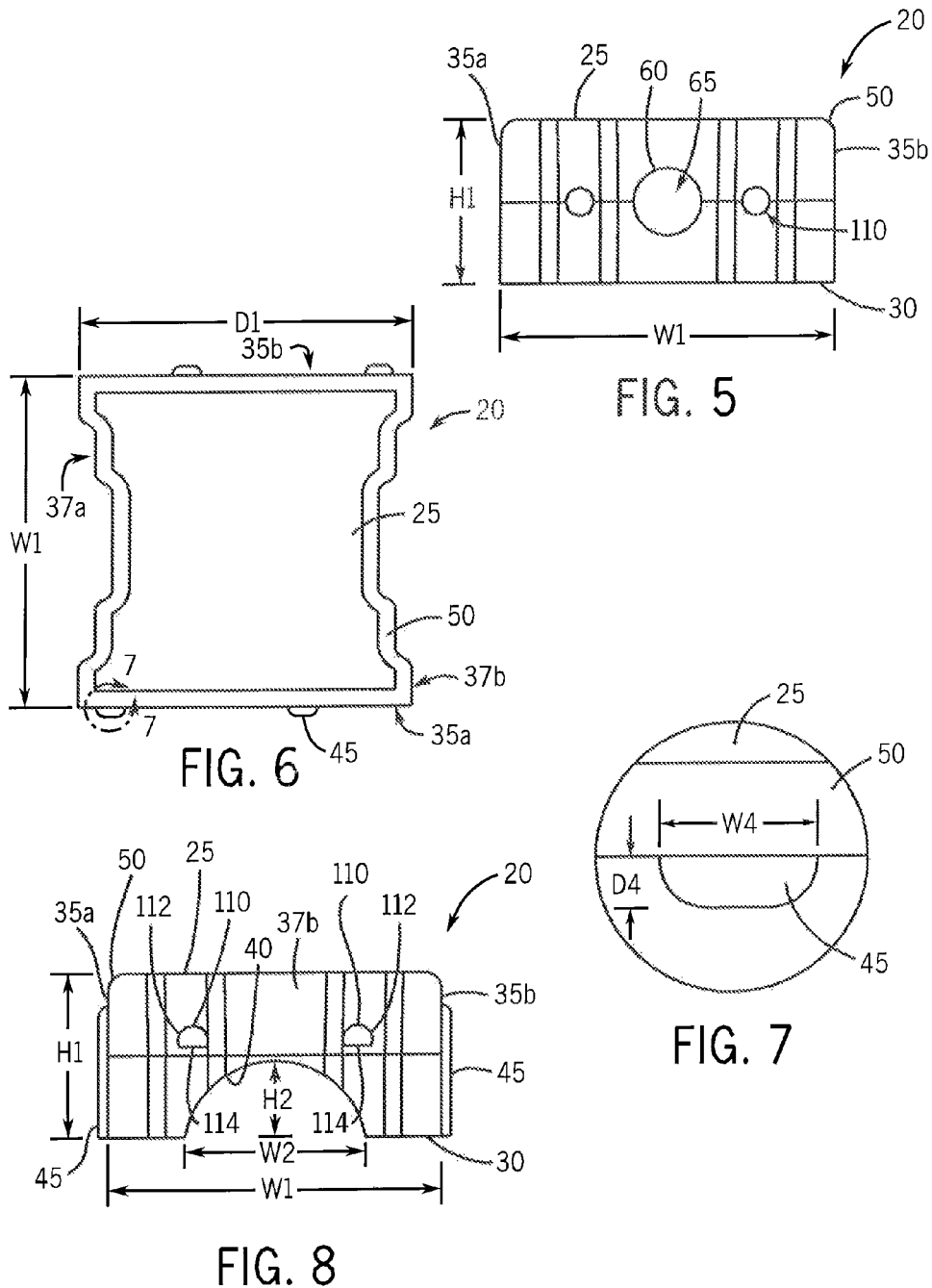

PERMEABLE PAVING SYSTEM

CROSS-REFERENCE TO RELATED APPLICATIONS

This application is a continuation-in-part of U.S. patent application Ser. No. 12/014,325, filed Jan. 15, 2008 now U.S. Pat. No. 8,251,607, the entire contents of which is incorporated herein by reference.

BACKGROUND OF THE INVENTION

1. Field of the Invention

The present invention relates in general to the field of paving systems. More particularly, the present invention relates to a modular, permeable paving system. Specifically, a preferred embodiment of the present invention relates to a permeable paving system utilizing paving units made from blocks cabled together and providing fluid storage within the blocks.

2. Discussion of the Related Art

As is known to those skilled in the art, paving systems historically create a surface impervious to rain. The water that falls on the paved surface runs off the edge of the paving surface rather than being absorbed into the ground beneath the paved surface. It is recognized that an increasing number of paved surfaces and the subsequent stormwater runoff from these paved surfaces contributes to lowered water tables and rising stream levels. Thus, it is a previously recognized problem with paving systems that stormwater runoff needs to be managed.

Historically, it was known in the prior art to manage stormwater using a curb and gutter system to guide the stormwater into sewer systems. More recently the stormwater has been guided into detention basins to allow the water to be absorbed closer to the paved surface. Needless to say, it is desirable to provide a permeable pavement system allowing the stormwater to drain through the paving system and to be absorbed into the ground under the paving system, minimizing the need for any additional stormwater management system.

However, such a permeable pavement system has not been fully realized without incurring various disadvantages. For example, U.S. Pat. No. 5,797,698 and U.S. Pat. No. 6,939,077 disclose paving elements designed to allow water to drain between adjacent paving blocks. While these paver blocks, as disclosed, allow stormwater to drain down the sides of the block, they are still susceptible to one of the major drawbacks of existing permeable pavement systems: they are dependent on the aggregate interlock and aggregate subgrade and the underlying soil for infiltration. Sandy or rocky soils have more cracks and fissures that allow the water to filter into and away from the surface, but heavy, clay soils do not drain quickly and require a longer retention time prior to the water entering the soil.

Another previously recognized approach to solving the problem of being dependent on the subgrade and soil for infiltration involves the use of underground storage systems. These storage systems are made of plastic and have several feet of aggregate dumped on top of them. A disadvantage of this approach is the inability to clean out the underground storage systems once they are filled with sedimentation and particulates from stormwater runoff. Therefore, a preferred solution will manage the stormwater runoff to improve infiltration of the water into any type of soil and, if it becomes necessary, will allow for sedimentation to be cleaned out from the water storage system.

SUMMARY AND OBJECTS OF THE INVENTION

Consistent with the foregoing and in accordance with the invention as embodied and broadly described herein, a paver block and a permeable pavement system are disclosed in suitable detail to enable one of ordinary skill in the art to make and use the invention.

In basic form, the invention is a permeable paving system made up of interlocking blocks. These blocks and multiple blocks may be installed as a mat. The blocks are designed to facilitate water drainage down the sides of the block. In addition, the blocks include a storage cavity storing fluid within the block. This results in a permeable paving system that provides for stormwater storage within the paving system unlike conventional paving systems.

In one embodiment of the invention, a block includes an upper surface and a lower surface opposite the upper surface. The upper and lower surfaces are connected by a plurality of sides. At least one of the sides includes a drainage spacer that extends along at least a portion of the side. At least one of the lower surface and the plurality of sides has a cavity at least partially enclosed by the block. The cavity allows fluid to be stored within the block, and the volume of the cavity is at least two percent of the volume of the block.

In another embodiment of the invention, the cavity extends along the lower surface of the block. The width of the cavity is between 25 and 60 percent of the width of the lower surface, and the height of the cavity is between 25 and 60 percent of the height of one of the sides of the block.

In still another embodiment, the cavity extends along one of the sides of the block. The height of the cavity is between 25 and 50 percent of the height of one of the sides, and the width of the cavity is between 20 and 50 percent of the width of the upper surface of the block.

In another embodiment, the upper surface joins the plurality of sides at a rounded edge, and the angle, alpha ($\alpha$), between at least one of the sides and a vertical plane is less than about five degrees. In yet another embodiment, the cavity of the block is arched, and in still another embodiment, the cavity of the block has sufficient volume to store at least an inch of rain that falls on the upper surface of the block.

In one embodiment, the block includes an upper surface and a lower surface opposite the upper surface. The upper and lower surfaces are connected by a plurality of sides. At least one of the sides includes a drainage spacer that extends along at least a portion of the side. A first side of the block contains at least one aperture and a second, opposing side contains at least one aperture. Each of the apertures on the first side has a corresponding aperture on the second side and a fluid passage is defined between each of the corresponding apertures. The volume of the at least one fluid passage is at least two percent of the volume of the block and allows fluid storage within the block.

In still another embodiment of the invention, a permeable pavement system includes a plurality of blocks. Each of the plurality of blocks may be, but is not limited to, one of the embodiments of blocks described above. A cable runs through a plurality of ducts. Each duct is contained within one of the plurality of blocks. The cable-connected blocks may then be installed as a single paving unit.

According to yet another embodiment of the invention, a permeable paving system includes a plurality of paving units, and each paving unit includes a plurality of blocks. Each block includes a pair of ducts, extending through the block, and a storage cavity. The paving unit also includes a plurality of cables having a first end and a second end. The first end of each cable is inserted through one of the ducts of the multiple blocks, joining the multiple blocks, until the majority of each cable is contained within the multiple blocks. In one embodiment, the first end of each cable is looped back and secured to the cable to form a first lifting loop, and the second end of each cable is looped back and secured to the cable to form a second lifting loop.

In another embodiment, two cables are connected to provide a singular cable and lifting loop. The cables are preferably extend a foot or two beyond the side of the block and are crimped together to form a singular loop with metal crimps.

In another aspect of the invention, a first duct of the pair of ducts is proximate to a first side of the block, and a second duct of the pair of ducts is proximate to a second side of the block. Each cable is inserted alternately through a first duct and a second duct of successive blocks. In still another aspect of the invention, each block has a first end a second end opposite the first end. The first end of each block has a first non-planar geometric surface, and the second end of each block has a second non-planar geometric surface complementary to the first non-planar geometric surface such that the first end and the second end restrict lateral movement between adjacent blocks.

According to yet another aspect of the invention, the permeable paving system further includes at least two paving units and a plurality of lock blocks. Each paving unit has a first end, a second end, and a width, and each lock block has a depth and a width. The width of each lock block is generally uniform and less than the width of the paving unit. One end of one of the two paving units is opposed to one end of the other of the at least two paving units and spaced apart by the depth of the lock block. Each of the lock blocks is placed adjacent to another of the lock blocks between the two paving units.

In still another aspect of the invention, each of the lock blocks is substantially the same as each of the plurality of blocks in the paving unit. For each of the plurality of blocks and each of the lock blocks, an upper surface is closed and a lower surface includes the storage cavity. The storage cavity is an arched channel extending along the depth of the block, and the first lifting loop and the second lifting loop of the opposed paving units are configured to fit within the storage cavity of one of the lock blocks. Each of the lock blocks adjacent to one of the paving units may be removed such that the paving unit may be lifted from the paving system to allow the cavities of each of the plurality of blocks to be cleaned. The paving units may be reinserted into the paving system and each of the lock blocks reinstalled.

In yet another aspect of the invention, the permeable pavement system further includes a subgrade extending substantially beneath each of the paving units. The cavities in the plurality of blocks have sufficient volume to store at least one inch of rain, which falls on an upper surface of each of the plurality of blocks and which subsequently filters into the subgrade.

In yet another embodiment of the invention, a permeable pavement system includes at least two paving units. Each paving unit has a first end, a second end opposite the first end, a plurality of blocks, and a plurality of cables joining the plurality of blocks. Each of the plurality of cables is terminated at a first lifting loop at the first end of the paving unit and a second lifting loop at the second end of the paving unit.

In still another aspect of the invention, the permeable paving system further includes a plurality of lock blocks. Each lock block is configured to be placed between one of the first end and the second end of a first paving unit and one of the first end and the second end of a second paving unit. Each of the lock blocks may be substantially the same as each of the plurality of blocks in the paving units.

According to another aspect of the invention, the permeable paving system further includes a subgrade extending under each of the paving units. The subgrade may include between 6 inches (15.2 cm) and 11 inches (28.9 cm) of stone. A first layer of the subgrade may include stone less than 1 inch (2.5 cm) in diameter and a second layer of the subgrade may include stone greater than 1 inch (2.5 cm) in diameter.

In yet another aspect of the invention, each of the blocks includes a closed upper surface and a lower surface having a channel extending along the depth of the block. Each of the blocks may include at least one drainage spacer protruding from a first side and a second side opposite the first side. Each drainage spacer extends along a portion of the height of each side. The channels in the plurality of blocks have sufficient volume to store at least one inch of rain, which falls on the upper surface of each of the plurality of blocks, within the paving unit such that the water filters into a subgrade.

In still another embodiment of the invention, a permeable paving system includes a subgrade, a plurality of paving units, and a plurality of cables. The subgrade includes between about 5 inches (12.7 cm) and 11 inches (28.9 cm) of stone. The plurality of paving units is configured to be placed on the subgrade and each paving unit includes a plurality of blocks. Each block includes a lower surface, an upper surface opposite the lower surface, a first side wall extending between the lower surface and the upper surface, a second side wall opposite the first side wall and extending between the lower surface and the upper surface, a first end extending between the lower surface and the upper surface, a second end opposite the first end and extending between the lower surface and the upper surface, a pair of ducts extending through the block between the first end and the second end, a storage cavity extending along the lower surface between the first end and the second end, and a pair of spacers protruding from each of the first and the second side wall. The plurality of cables has a first end and a second end. The first end of each cable is inserted through one of the ducts of multiple blocks until the majority of each cable is contained within the multiple blocks. The first end of each cable is looped back and secured to the cable to form a first lifting loop, and the second end of each cable is looped back and secured to the cable to form a second lifting loop.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which:

FIG. 5 is an end view of another embodiment of a block incorporated into the paving system according to the present invention;

FIG. 6 is a top view of another embodiment of a block incorporated into the paving system according to the present invention;

FIG. 7 is a sectional view taken along 7-7 of FIG. 6;

FIG. 8 is an end view of the embodiment of the block of FIG. 6;

Figure 1:
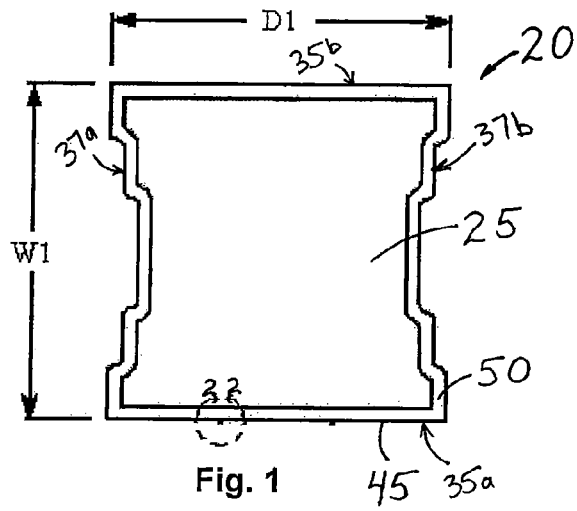
FIG. 1 is a top view of one embodiment of a block incorporated into the paving system according to the present invention.
Figure 2:
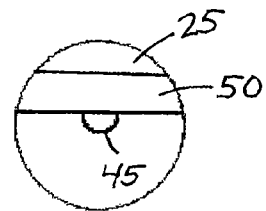
FIG. 2 is a sectional view taken along 2-2 of FIG. 1.

In describing the preferred embodiments of the invention which are illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word "connected", "attached", or terms similar thereto are often used. They are not limited to direct connection but include connection through other elements where such connection is recognized as being equivalent by those skilled in the art.

DESCRIPTION OF PREFERRED EMBODIMENTS

Specific embodiments of the present invention will now be further described by the following, non-limiting examples which will serve to illustrate various features of significance. The examples are intended merely to facilitate an understanding of ways in which the present invention may be practiced and to further enable those of skill in the art to practice the present invention. Accordingly, the examples should not be construed as limiting the scope of the present invention.

Figure 3:
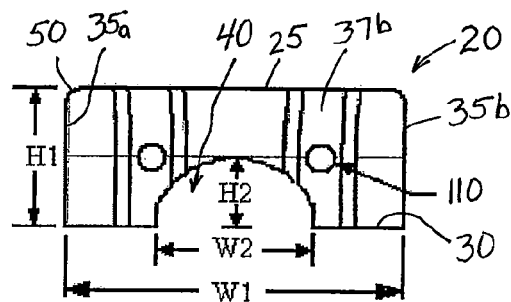
FIG. 3 is an end view of the embodiment of the block of FIG. 1.
Figure 4:
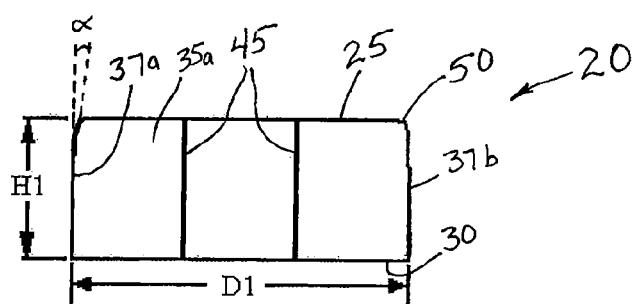
FIG. 4 is a side view of the embodiment of the block of FIG. 1.

Turning initially to FIGS. 1-4, one embodiment of a block 20 used in a permeable pavement or permeable paving system 100 is illustrated. The block 20 is generally comprised of an upper surface 25, a lower surface 30, a first side wall, or side, 35a, a second side wall, or side, 35b, a first end 37a, a second end 37b, and a cavity 40. It is contemplated that the block 20, for example, a paver block, could be of any shape known to one of ordinary skill in the art, including, but not limited to, a square, a rectangle, and a hexagon. As illustrated in FIG. 1, the paver block 20 has two generally flat sides, 35a and 35b, and two stepped ends, 37a and 37b. Additionally, the paver block 20, may be manufactured in a variety of heights, H1, widths, W1, and depths, D1. Preferably, the range of dimensions for the paver block 20 is from 9 to 15 inches (22.9 to 38.1 cm) wide, 9 to 15 inches (22.9 to 38.1 cm) deep, and 4 to 7 inches (10.2 to 17.8 cm) high. In one embodiment, the block is about 12 inches (30.5 cm) wide, 12 inches (30.5 cm) deep and 5 inches (12.7 cm) high. The paver block may be manufactured out of any material known to one of ordinary skill in the art, but is preferably a concrete block. At least one drainage spacer 45 extends at least partially along one of the sides, 35a or 35b, of the paver block 20. As illustrated in FIGS. 1 and 4, two drainage spacers 45 may extend vertically along the entire height, H1, of one of the sides, 35a or 35b, of the paver block 20. In addition, at least one, and preferably all, of edges 50 between the upper surface 25 and each of the sides, 35a and 35b, and each of the ends, 37a and 37b, will be rounded, creating seepage down the block.

When used in a permeable pavement or permeable paving system 100, multiple paver blocks 20 may be installed as a single paving unit 115 to increase the speed and efficiency of installation. To permit installation as a single paving unit 115, each paver block 20 includes holes or ducts 110 passing through the paver block 20. Each duct 110 is sized to allow a cable 105 to pass therethrough, and is preferably about one inch in diameter. In addition, the ends, 37a and 37b, of the blocks through which the ducts 110 pass will have some angle, alpha (α), between the end, 37a or 37b, and a vertical plane. It is desirable to minimize this angle as much as possible; however, the angle provides flexibility between blocks in a paving unit 115. It is desirable to keep this angle, alpha (α), at about 3 degrees and preferably between 1 and 5 degrees. See, for example, FIG. 4.

Referring next to FIGS. 6-10, another embodiment of a paver block 20 used in the permeable paving system 100 is illustrated. The paver block 20 is generally comprised of an upper surface 25, a lower surface 30, a first side 35a, a second side 35b, a first end 37a, a second end 37b, and a cavity 40. The paver block 20 has two flat sides, 35a and 35b, and two stepped ends, 37a and 37b. It is contemplated that each of the ends, 37a and 37b, may have various non-planar, geometric configurations other than the stepped end such that when placed next to each other, the first end 37a and the second end 37b restrict lateral movement between adjacent blocks. The paver block 20, may be manufactured in a variety of heights, H1, widths, W1, and depths, D1. The illustrated embodiment of the paver block 20 is about 11.8 inches (30 cm) wide, 11.8 inches (30 cm) deep and 5.6 inches (14.2 cm) high. A pair of drainage spacers 45 protrudes from and extends at least partially along each of the flat sides, 35a or 35b, of the paver block 20. Further, the drainage spacers 45 on a first flat side 35a are laterally aligned such that they are offset from the drainage spacers 45 on a second flat side 35b. Thus, when two paver blocks 20 are placed adjacent to each other, the drainage spacers 45 on the first flat side 35a of the first paver block 20 engage the second flat side 35b of the second paver block 20. Similarly, the drainage spacers 45 on the second flat side 35a of the second paver block 20 engage the first flat side 35b of the first paver block 20. The drainage spacers 45 may be manufactured in a variety of heights, H4, widths, W4, and depths, D4. Preferably, the range of dimensions for the drainage spacers 45 is from ⅛ to 2 inches (0.3 to 5.1 cm) wide, 1/16 to ½ inches (0.2 to 1.3 cm) deep, and from one-half the height, H1, of the paver block 20 to the entire height, H1 of the paver block. The drainage spacers 45 of the illustrated embodiment are about 1 inch (2.5 cm) wide, ⅜ inches (1.0 cm) deep, and about 80 percent of the height, H1, of the paver block 20.

Figure 9:
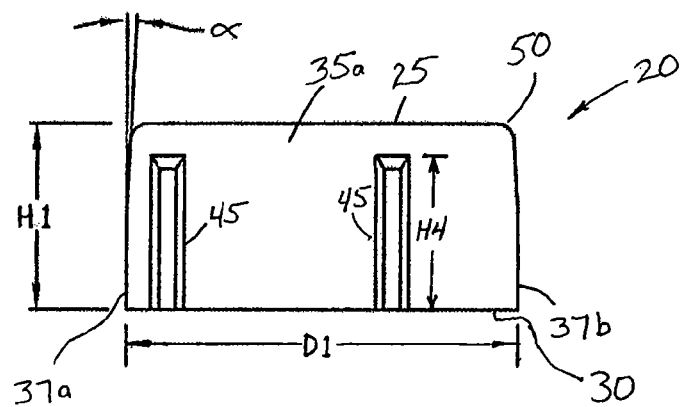
FIG. 9 is a right side view of the embodiment of the block of FIG. 6.
Figure 10:
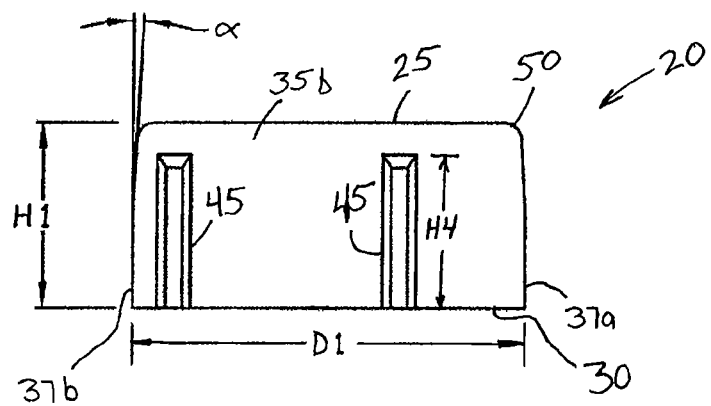
FIG. 10 is a left side view of the embodiment of the block of FIG. 6.

Each paver block 20 also includes ducts 110 passing from the first end 37a to the second end 37b of the paver block 20. Each duct 110 is sized to allow a cable 105 to pass therethrough and may have any suitable cross-section. As illustrated in FIG. 8, an upper portion 112 of the duct 110 may be curved and a lower surface 114 of the duct 110 may be planar. Referring to FIGS. 9 and 10, the ends, 37a and 37b, of the blocks through which the ducts 110 pass will have some angle, alpha (α), between the end, 37a or 37b, and a vertical plane. It is desirable to minimize this angle as much as possible; however, the angle provides flexibility between blocks in a paving unit 115. It is desirable to keep this angle, alpha (α), at about 3 degrees and preferably between 1 and 5 degrees.

Referring next to FIGS. 3 and 8, a cavity 40 allows fluid storage within the paver block 20 and is configured to contain stormwater that has drained down the paver block 20. The cavity 40 may be partially or wholly defined by the paver block 20. The cavity 40 may be designed in a wide variety of shapes and sizes to allow for fluid storage within the paver block 20. In the illustrated embodiment, the cavity 40 is an arch extending along the entire depth, D1, of the bottom surface 30. Another embodiment of the cavity 40 is shown in FIG. 5 wherein the cavity 40 is a fluid passage 65 extending entirely through the paver block 20. A further embodiment of the cavity 40, not illustrated, may include multiple fluid passages 65 extending through the paver block 20. Still another embodiment of the cavity 40, not illustrated, may be an arch extending along one or both of the sides, 35a and 35b, of the paver block. The afore-mentioned examples disclose several embodiments for the cavity 40, but the structure of the cavity 40 could be any shape or size capable of storing fluid within the block such as, but not limited to, a square, rectangular, or triangular cavity extending across the bottom, side, or through the paver block 20. The cavity 40 extends generally along the center line of the block 20 defining, at least in part, a first and second generally planar portion of the lower surface 114 extending along the cavity 40 and between each of the first side 35a and the second side 35b, respectively, of the block 20. Because the width of the cavity 40 may vary between about 25 to about 60 percent of the width of the lower surface 114, the first and second planar portions of the lower surface 114 may conversely define between about 40 and 75 percent of the lower surface 114. In one preferred embodiment, the cavity 40 is an arched channel having a radius of about 3.3 inches (8.5 cm) and a height of about 2.6 inches (6.5 cm) as shown in FIG. 8.

The paver block 20 is designed to balance fluid storage and structural integrity. Preferably, the volume of the cavity 40 allows for at least the first inch (2.5 cm) of stormwater that falls on the top surface 25 of the paver block 20 to be stored within the cavity 40 of the paver block 20. This stored water subsequently filters out of the cavity 40 into the aggregate subgrade 135 and soil below the paving system 100.

Figure 11:
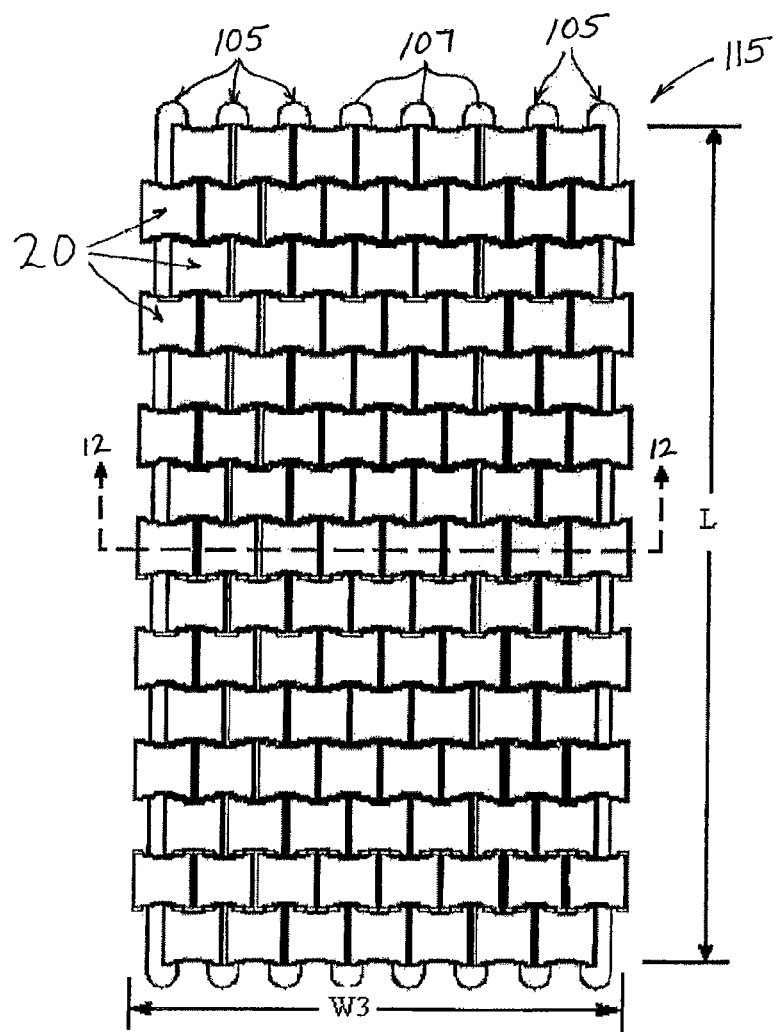
FIG. 11 is a top view of one embodiment of a paving unit incorporated into the paving system according to the present invention.
Figure 12:
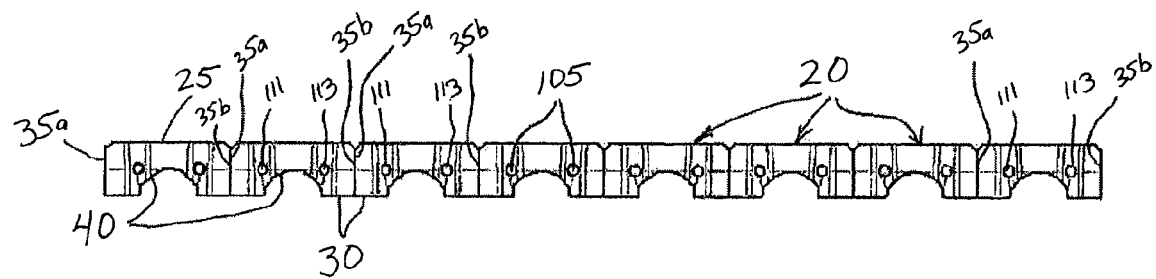
FIG. 12 is a sectional view taken along 12-12 of FIG. 11.

Referring next to FIGS. 11 and 12, a paving unit 115 is constructed by passing multiple cables 105 through multiple paver blocks 20. As illustrated, each paver block 20 may have a first duct 111 positioned proximate to the first side 35a and a second duct 113 proximate to the second side 35b. The cable 105 may be inserted alternately through a first duct 111 and a second duct 113 of successive blocks. Optionally, the cable 105 may be inserted exclusively through either the first duct 111 or the second duct 113 of each block 20. It is contemplated that the cable 105 may be, but is not limited to, one of the following materials: polyester, stainless steel, and galvanized steel. The resulting paving defines a first side 116, a second side 118, a first end 117, and a second end 119.

Figure 13:
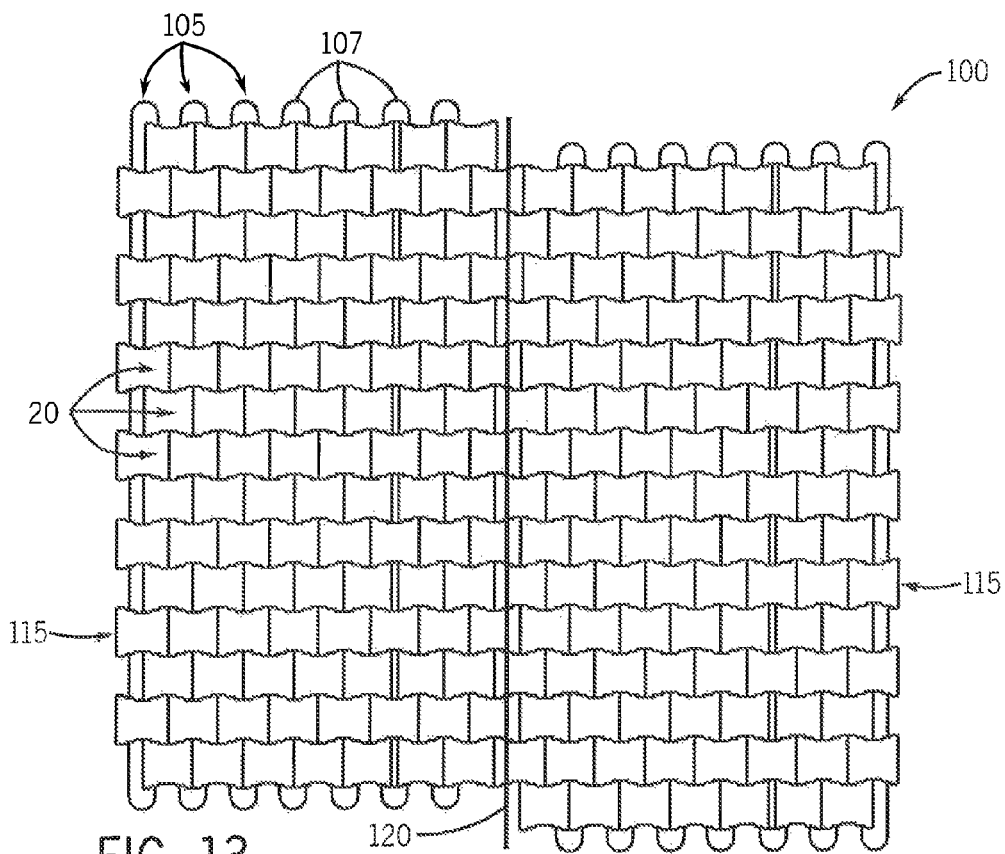
FIG. 13 is a top view of one embodiment of the present invention.

According to one embodiment of the invention, illustrated in FIGS. 11 and 13, the cable 105 may protrude a short distance beyond the end of the last block 20 and loop back through the blocks 20 to create a lifting loop 107 at the end of each paving unit 115. According to another embodiment of the invention, each cable 105 may terminate after passing through a single set of aligned ducts 110. A first lifting loop 107 may be formed by looping back one end of the cable 105 and securing it to itself by any suitable device, such as a ferrule, clamp, or clip. A second lifting loop 107 may similarly be formed by looping back the other end of the cable 105 and securing it to itself.

In another embodiment, two cables are preferably connected to provide a singular cable and lifting loop. The cables preferably extend a foot or two beyond the side of the block and are crimped together to form a singular loop with metal crimps. In order to maximize cable movement when placing the paving unit 115, there are no washers or spacers provided between the end of the cable loop and the block and the crimps are far enough away to minimize interference. Once the unit is set in place, the singular cable is used to tighten the individual blocks within unit up. The cable is then folded over under the cavity of the last blocks in the unit. The cable is preferably made of a polyester for strength and integrity.

It is contemplated that the paving unit 115 will be of varying widths, W3, and lengths, L, to accommodate the desired application, including, but not limited to, pathways, driveways, parking lots, and roads. Preferably, the paving unit 115 is about 8 feet (2.4 m) wide and may extend from 8 to 60 feet (2.4 to 18.3 m) in length. Based on its application, the paver block 20 may accommodate either pedestrian or vehicular traffic. The paver block 20 is preferably designed to accommodate a load of up to 4000 pounds per square inch (19.2 newton per square centimeter).

Referring next to FIG. 13, multiple paving units may be installed adjacent to each other. Because the cable 105 is inserted in an alternating fashion between the first duct 111 and the second duct 113 of successive blocks 20, a staggered edge forms along the paving unit 115. As a first paving unit 115 and a second paving unit 115 are installed adjacent to each other, the paver blocks 20 along the side of the second paving unit 115 are positioned such that they interweave with the blocks 20 along the side of the first paving unit 115 in a "zippered" fashion, creating a continuous paved surface. In addition, the outer row of the ducts 110 along each edge of the paving units 115 may be left open during initial assembly because a cable 105 inserted in this row would alternately pass through a duct 110 and open space. However, once adjacent paving units 115 have been installed, the outer row of ducts 110 of one paving unit 115 align with the outer row of ducts 110 of the other paving unit 115. Optionally, an interlocking cable 120 may, therefore, be passed through the two paving units, securing the first paving unit 115 to the second paving unit 115.

Figure 14:
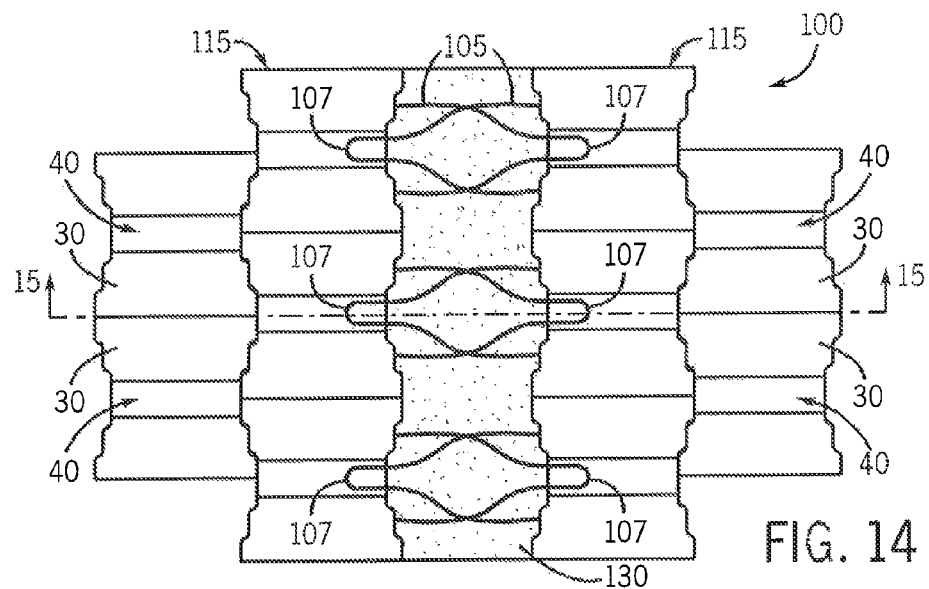
FIG. 14 is a bottom view of a joint connecting two paving units according to the embodiment shown in FIG. 13.
Figure 15:
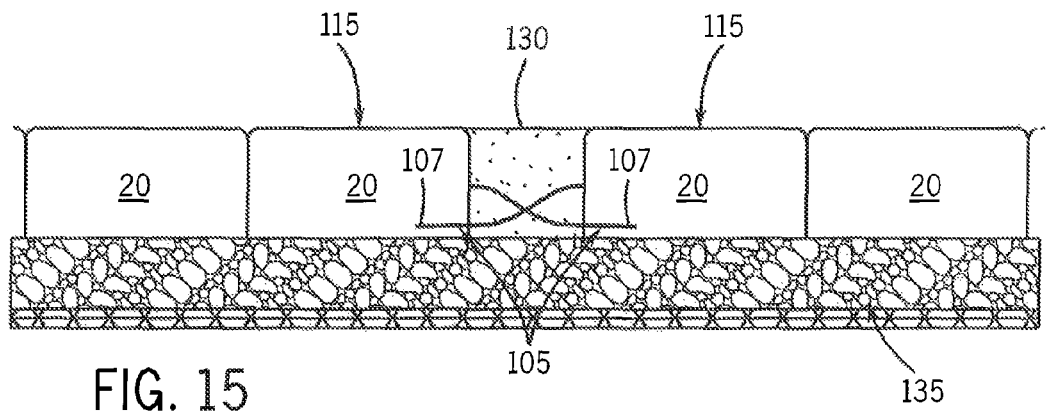
FIG. 15 is a sectional view taken along 15-15 of FIG. 14.
Figure 16:
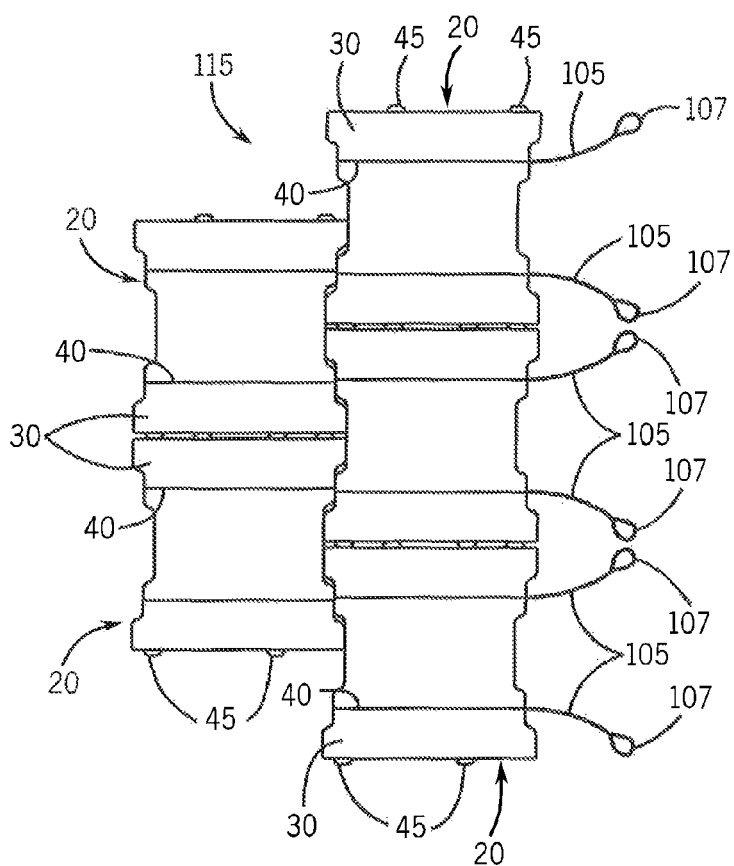
FIG. 16 is a partial bottom view of another embodiment of a paving unit incorporated into the paving system according to the present invention.
Figure 17:
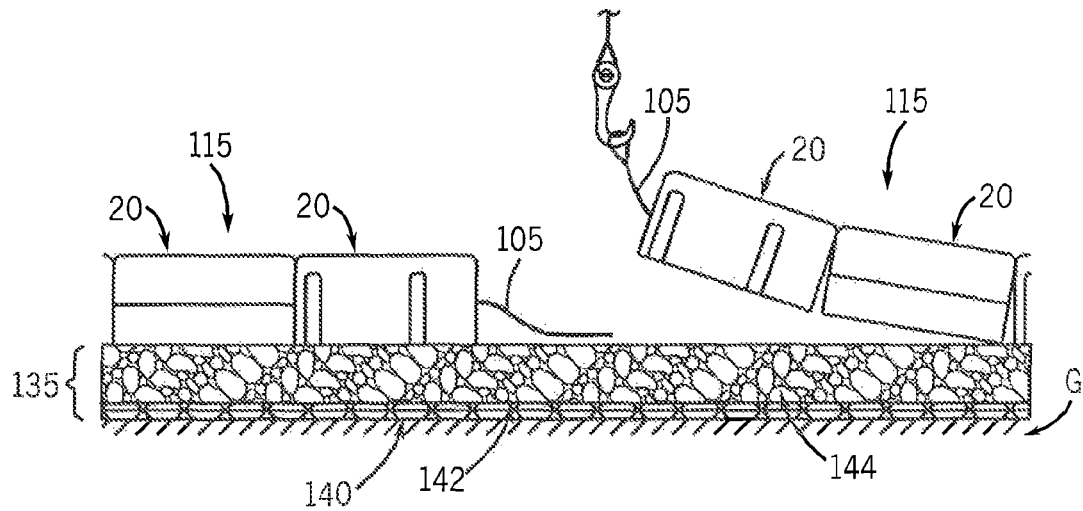
FIG. 17 is a sectional view of a paving unit as shown in FIG. 16 being positioned end-to-end to another paving unit as shown in FIG. 16.
Figure 18:
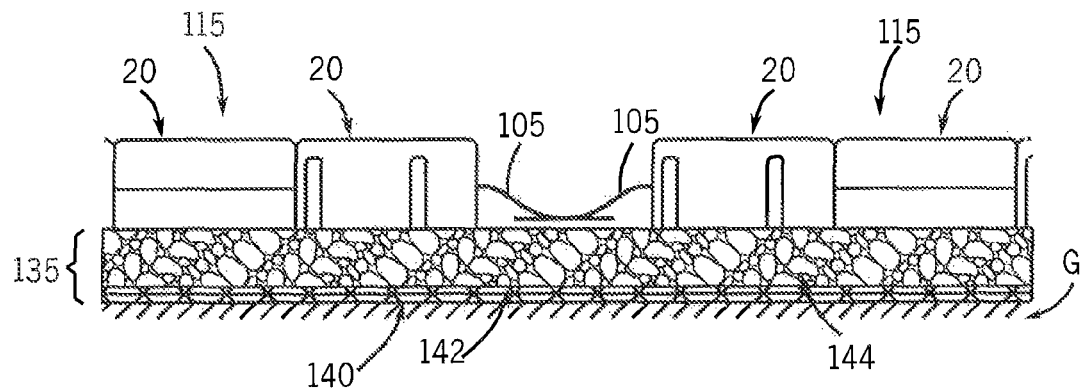
FIG. 18 is a partial bottom view of the two paving units shown in FIG. 17 without a lock block inserted.
Figure 19:
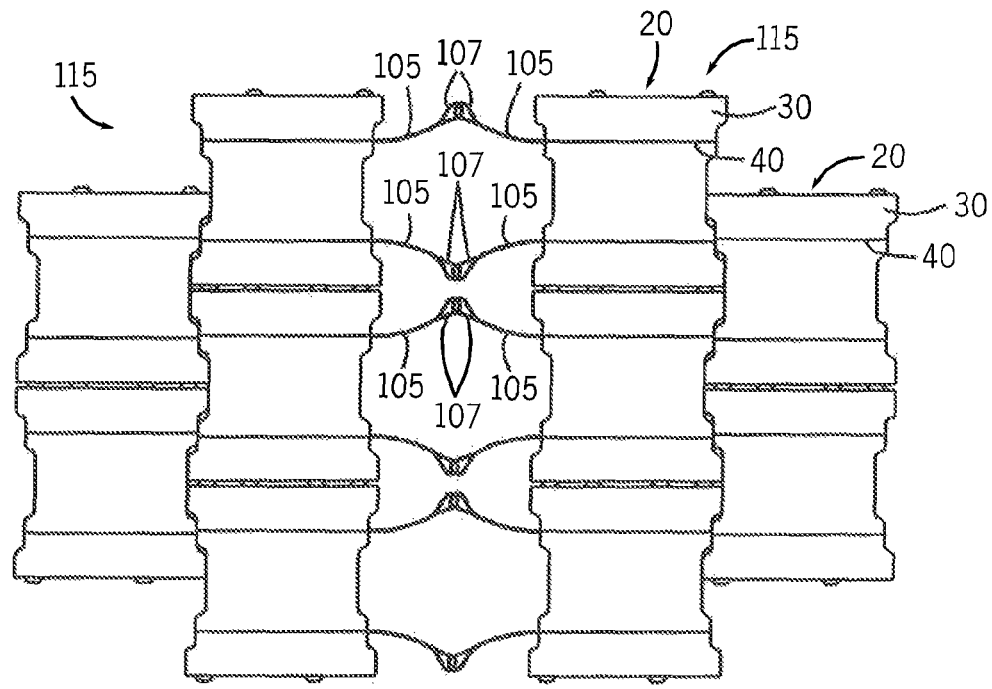
FIG. 19 is a partial sectional view of the two paving units shown in FIG. 17 without a lock block inserted.
Figure 20:
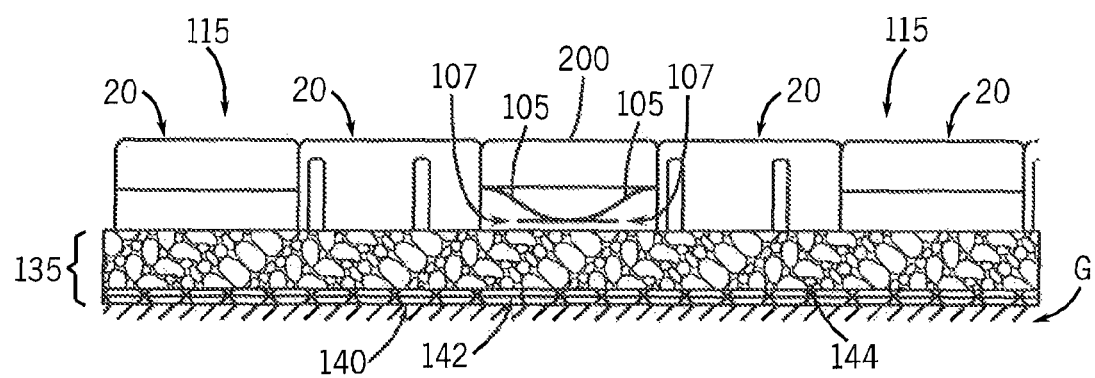
FIG. 20 is a partial bottom view of the two paving units shown in FIG. 17 with a lock block inserted.
Figure 21:
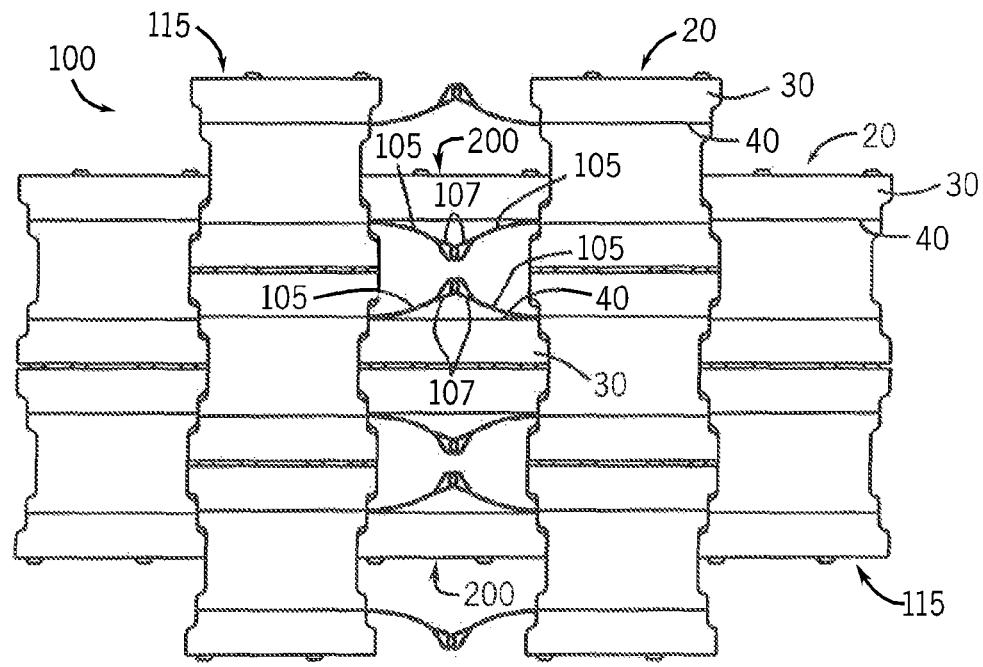
FIG. 21 is a partial sectional view of the two paving units shown in FIG. 17 with a lock block inserted.

Multiple paving units 115 may also be installed in an end-to-end configuration. According to one embodiment of the invention, illustrated in FIGS. 14 and 15, the end loops 107 of the first paving unit 115 are tucked into the cavities 40 of the paver blocks 20 at the end of the second paving unit 115. Likewise, the end loops 107 of the second paving unit 115 are tucked into the cavities 40 of the paver blocks 20 at the end of the first paving unit 115. A sheath is laid into the gap between the two paving units 115. Preferably, a very narrow veneer plastic sheath is used. Moreover, the preferred plastic sheath is only ten to twelve inches wide and eight to ten mils thick. This sheath prevents grout from entering the cavities 40 of the paver blocks 20 at the end of either paving unit 115 and additionally isolates the cables 105 from the grout. Finally, grout is poured between the two paving units 115 to form a joint 130. The grout may be of any type known to one of skill in the art and suitable for the application, but is preferably a pervious concrete or small aggregate grout.

According to another embodiment of the invention, illustrated in FIGS. 17-21, a second installation method is illustrated. A first paving unit 115 and a second paving unit 115 are installed in an end-to-end configuration. Due to the symmetry of the paving units 115, a first end 117 of one paving unit 115 may be placed adjacent to either a first end 117 or a second end 119 of another paving unit 115. The paving units 115 are spaced apart by a width substantially equal to the depth, D1, of one paver block 20. The lifting loops 107 of adjacent paving units 115 are positioned on the substrate 135 such that they align with a storage cavity 40 in a subsequently inserted lock block 200. Lock blocks 200 are inserted between the two paving units 115 to form a generally continuous surface between the two paving units 115. According to one embodiment of the invention, each of the lock blocks 200 is substantially the same as each of the paver blocks 20 used in the paving units 115. Optionally, the lock blocks 200 may be of any suitable form to cover the lifting loops 107 and span the distance between the two paving units 115.

Prior to installing the paving units 115, a suitable subgrade 135 may be laid over the ground, G, on which the paving system 100 is to be installed. The thickness and/or composition of the subgrade 135 may vary according to the site requirements. According to one embodiment of the invention, a barrier layer 140, such as a geogrid or geotextile material, may first cover the ground, G. A first layer of stone 142 covers the barrier layer 140. The first layer of stone 142 may be between 5 and 10 inches (12.7 and 25.4 cm) thick and includes stone having a diameter of about 1 to 1 and one-half inches (2.5 to 3.8 cm). A second layer of stone 144 covers the first layer of stone 142. The second layer of stone 144 is preferably one half inch (1.3 cm) thick and more preferably at least one inch (2.5 cm) thick, including stone having a diameter less than 1 inch (2.5 cm).

Figure 22:
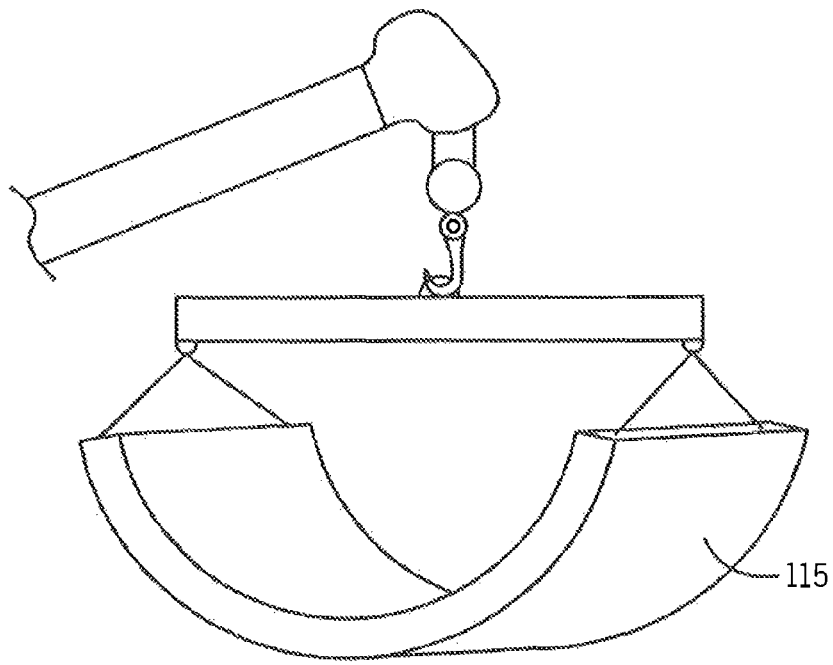
FIG. 22 is an exemplary embodiment of lifting a paving unit.

Each paving unit 115 is preferably installed as a single unit. Referring to FIG. 22, an exemplary paving unit 115 is being lifted using a crane, but installation may be performed by any means known to one skilled in the art, such as a forklift. Further, if cleaning of the cavities 40 of the paver blocks 20 becomes necessary, the paving unit 115 may be subsequently lifted out, the cavities 40 and subgrade 135 cleaned of debris, and the paving unit 115 reinstalled.

In operation, the paving units 115 are installed according to the requirements of each paving system 100. The ground, G, of the installation site is tested to determine the appropriate composition and thickness of the subgrade 135. After laying the subgrade 135, the paving units 115 are installed to cover the installation site. Individual blocks 20 are inserted around the perimeter of the paving system 100 as necessary to provide a generally linear edge. Lock blocks 200 are inserted between paving units 115 to complete the surface of the paving system 100. When rain falls on the paving system 100, the rain runs down between the blocks 20 and is either filtered into the subgrade 135 or stored in the cavities 40 of the paving system 100 according to the capacity of the subgrade 135 and the rate of rainfall. As the rate of rainfall slows and/or stops, additional water stored in the cavities 40 of the blocks 20 is filtered into the subgrade 135. The cavities in each of the plurality of blocks has sufficient volume to store at least one inch (2.5 cm) of rain from the upper surface of the plurality of blocks in the paving unit.

The paving unit 115, after having been installed, may require occasional cleaning. The paving system 100 is configured such that each of the lock blocks 200 along one end of a paving unit 115 may be removed, allowing the paving unit 115 to be subsequently lifted as a single unit and to allow cleaning of the cavities 40 of the blocks 20, as necessary. Any debris or particulate present on the surface of the subgrade 135 may similarly be removed. Once the cleaning is complete, the steps may be reversed. The paving unit 115 is reinstalled and each of the lock blocks 200 reinserted. Optionally, access to the cavities 40 may be provided from one end of the paving system 100 and the blocks 20 may be cleaned while the paving units 115 remain installed.

Figure 23:
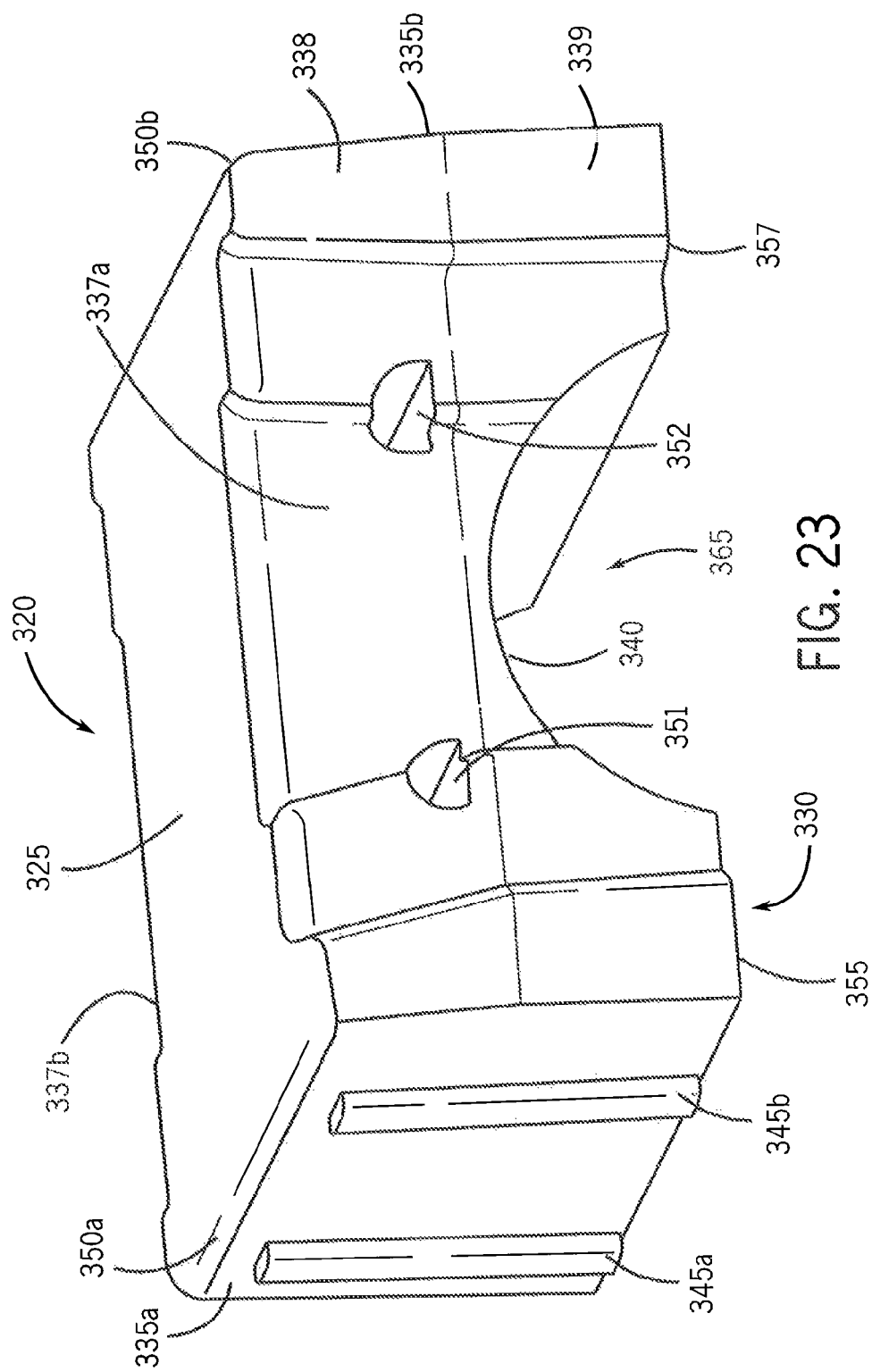
FIG. 23 shows a perspective view of another embodiment of the present invention.

Turning now to FIG. 23, another embodiment of the inventive block is shown. Block 320 may also be used in a permeable pavement or permeable paving system 100 (not shown). The block 320 has an upper surface 325, a lower surface 330, a first side wall, or side, 335a, a second side wall, or side, 335b, a first end 337a, a second end 337b, and a cavity 340. As illustrated, the paver block 320 has two generally flat sides, 335a and 335b, and two ends, 337a and 337b, that have a stepped structure. In this embodiment, the stepped sides protrude more than the embodiment described above. This helps the block have a more tightly fitting interconnection with similarly-shaped adjacent blocks. A pair of drainage spacers 345a, 345b preferably extend almost all of the height along both of the sides 335a and 335b of the paver block 320 from surface 325 to surface 330. All of edges, e.g., 350a and 350b between the upper surface 325 and each of the sides, 335a and 335b, and each of the ends, 337a and 337b, will be rounded, creating seepage down the block. Further, upper portion 338 of end 337a is angled slightly inwardly relative to lower portion 329 of side 337a. End 337b may be similarly constructed. At least two ducts 351, 352 are provided for receiving attachment cables. Finally, the lower surface 330 preferably has two feet 355 and 357 which come into contact with the aggregate on the ground. The feet 355 and 357 are separated by the cavity 340 which forms water drainage channel 365.

In one preferred embodiment, a mix used to construct a paving unit made up of about 125 blocks includes about:
  700 LBS CEMENT
  2875 LBS LIMESTONE
  2475 LBS C. SAND
  11 OZ PLP (PLASTICIZER—Acme)
  16 OZ BF3 (DENSIFIER/PLASICIZER—Essroc)

It should be noted that the invention can be utilized with existing permeable and non-permeable paving systems. For example, it is possible to install a subgrade 135 in or next to an existing concrete or asphalt parking lot. A paving unit 115, sized appropriately, may then be placed on the subgrade 135.

Alternately, the subgrade 135 and paving unit 115 may be laid down first. Appropriate spacers and/or screens are placed along each end of the paving unit 115 to prevent concrete or asphalt, being laid adjacent to the paving unit 115, from entering the cavities 40, fluid passages 65, or ducts 110 of the paving unit 115 as the concrete or asphalt is poured into the surrounding area.

It has been noted that the construction of the block and cavity minimize the puddling of water on the block. Further, ice melts faster off of the inventive block than it does off a conventional surface, again, because of the construction and makeup of the inventive block. Finally, paving projects can be completed much more rapidly and consistently than poured concrete projects or those accomplished with asphalt because of the construction of the block and the paving unit.

Although the best mode contemplated by the inventors of carrying out the present invention is disclosed above, practice of the present invention is not limited thereto. It will be manifest that various additions, modifications, and rearrangements of the features of the present invention may be made without deviating from the spirit and scope of the underlying inventive concept.

For example, individual components of the disclosed block and paving unit need not be formed in the disclosed shapes, or assembled in the disclosed configuration, but could be provided in virtually any shape, so as to provide a paver block/unit with the novel features, e.g., a cavity capable of storing fluid. Furthermore, all the disclosed features of each disclosed embodiment can be combined with, or substituted for, the disclosed features of every other disclosed embodiment except where such features are mutually exclusive.

It is intended that the appended claims cover all such additions, modifications, and rearrangements. Expedient embodiments of the present invention are differentiated by the appended claims.

What is claimed is:

1. A permeable paving system, comprising:
   a plurality of paving units, wherein each paving unit includes:
   a plurality of blocks, each block including a pair of ducts extending through the block and a storage cavity, and
   a plurality of cables having a first end and a second end, wherein
   the first end of each cable is inserted through one of the ducts of multiple blocks until the majority of each cable is contained within the multiple blocks,
   the first end of each cable is looped back and secured to the cable to form a first lifting loop, and
   the second end of each cable is looped back and secured to the cable to form a second lifting loop;
   at least two paving units, each paving unit having a first end, a second end, and a width; and
   a plurality of lock blocks having a depth and a width, wherein:
   the width of each lock block is generally uniform and less than the width of the paving unit,
   one end of one of the at least two paving units is opposed to one end of the other of the at least two paving units and spaced apart by the depth of the lock block, and
   each of the lock blocks is placed adjacent to another of the lock blocks between the two paving units;
   wherein each of the lock blocks is substantially the same as each of the plurality of blocks in the paving unit; and
   wherein, for each of the plurality of blocks and each of the lock blocks:
   an upper surface is closed,
   a lower surface includes the storage cavity,
   the storage cavity is an arched channel extending along the depth of the block, and
   the first lifting loop and the second lifting loop of the opposed paving units are configured to fit within the storage cavity of one of the lock blocks.

2. The permeable paving system of claim 1 wherein:
   a first duct of the pair of ducts is proximate to a first side of the block,
   a second duct of the pair of ducts is proximate to a second side of the block, and
   each cable is inserted alternately through a first duct and a second duct of successive blocks.

3. The permeable paving system of claim 2 wherein:
   each block has a first end a second end opposite the first end,
   the first end of each block has a first non-planar geometric surface, and
   the second end of each block has a second non-planar geometric surface complementary to the first non-planar geometric surface such that the first end and the second end restrict lateral movement between adjacent blocks.

4. The permeable pavement system of claim 1 wherein each of the lock blocks adjacent to one of the paving units is removable such that the paving unit may be lifted from the paving system to allow the cavities of each of the plurality of blocks to be cleaned.

5. The permeable pavement system of claim 4 wherein the paving units may be reinserted into the paving system and each of the lock blocks reinstalled.

6. The permeable pavement system of claim 1 further comprising a subgrade extending substantially beneath each of the paving units, wherein the storage cavities in the plurality of blocks have sufficient volume to store at least one inch of rain, which falls on an upper surface of each of the plurality of blocks and which subsequently filters into the subgrade.

7. A permeable pavement system comprising at least two paving units, each paving unit having:
   a first end,
   a second end opposite the first end,
   a plurality of blocks, and
   a plurality of cables joining the plurality of blocks, wherein each of the plurality of cables are terminated at a first lifting loop at the first end of the paving unit and a second lifting loop at the second end of the paving unit;
   a plurality of lock blocks, wherein each lock block is configured to be placed between one of the first end and the second end of a first paving unit and one of the first end and the second end of a second paving unit;
   wherein, for each of the plurality of blocks and each of the lock blocks:
   an upper surface is closed,
   a lower surface includes the storage cavity,
   the storage cavity is an arched channel extending along the depth of the block, and
   the first lifting loop and the second lifting loop of the opposed paving units are configured to fit within the storage cavity of one of the lock blocks.

8. The permeable paving system of claim 7 wherein each of the lock blocks is substantially the same as each of the plurality of blocks in the paving units.

9. The permeable paving system of claim 7 further comprising a subgrade extending under each of the paving units.

10. The permeable paving system of claim 9 wherein the subgrade includes between 15.2 centimeters and 28.9 centimeters of stone.

11. The permeable paving system of claim 10 wherein the subgrade includes a first layer of stone less than 2.5 centimeters in diameter and a second layer of stone greater than 2.5 centimeters in diameter.

12. The permeable paving system of claim 9 wherein each of the blocks includes a closed upper surface and a lower surface having a channel extending along the depth of the block.

13. The permeable paving system of claim 12 wherein each of the blocks includes at least one drainage spacer protruding from a first side and a second side opposite the first side, each drainage spacer extending along a portion of the height of each side.

14. The permeable paving system of claim 12 wherein the channels in the plurality of blocks have sufficient volume to store 2.5 centimeters of rain, which falls on the upper surface of each of the plurality of blocks, within the paving unit such that the water filters into a subgrade.

15. A permeable paving system, comprising:
  a subgrade, including between 12.7 centimeters and 28.9 centimeters of stone;
  a plurality of paving units configured to be placed on the subgrade, wherein each paving unit includes:
    a plurality of blocks, each block including:
      a lower surface,
      an upper surface opposite the lower surface,
      a first side wall extending between the lower surface and the upper surface,
      a second side wall opposite the first side wall and extending between the lower surface and the upper surface,
      a first end extending between the lower surface and the upper surface,
      a second end opposite the first end and extending between the lower surface and the upper surface,
      a pair of ducts extending through the block between the first end and the second end,
      a storage cavity extending along the lower surface between the first end and the second end, and
      a pair of spacers protruding from each of the first and the second side wall; and
  a plurality of cables having a first end and a second end, wherein
    the first end of each cable is inserted through one of the ducts of multiple blocks until the majority of each cable is contained within the multiple blocks,
    the first end of each cable is looped back and secured to the cable to form a first lifting loop, and
    the second end of each cable is looped back and secured to the cable to form a second lifting loop;
    the lower surface of each block includes a first generally planar portion extending between the first side wall and the storage cavity and a second generally planar portion extending between the second side wall and the storage cavity, wherein the first and the second generally planar portions define 40 to 75 percent of the lower surface;
    the first end of each block has a first non-planar geometric surface;
    the second end of each block has a second non-planar geometric surface complementary to the first non-planar geometric surface such that the first end and the second end restrict lateral movement between adjacent blocks; and
    each of the pairs of spacers extend vertically between 50 and 100 percent of the height of its corresponding side wall.

\* \* \* \* \*